(12) United States Patent
Salowey et al.

(10) Patent No.: US 8,543,471 B2
(45) Date of Patent: Sep. 24, 2013

(54) SYSTEM AND METHOD FOR SECURELY ACCESSING A WIRELESSLY ADVERTISED SERVICE

(75) Inventors: Joseph A. Salowey, Seattle, WA (US); David Sheldon Stephenson, San Jose, CA (US); Nancy Cam-Winget, Mountain View, CA (US); Chetin Ersoy, Portsmouth, NH (US)

(73) Assignee: Cisco Technology, Inc., San Jose, CA (US)

( * ) Notice: Subject to any disclaimer, the term of this patent is extended or adjusted under 35 U.S.C. 154(b) by 387 days.

(21) Appl. No.: 12/862,170

(22) Filed: Aug. 24, 2010

(65) Prior Publication Data

US 2012/0054848 A1 Mar. 1, 2012

(51) Int. Cl.
*G06Q 30/00* (2012.01)

(52) U.S. Cl.
USPC .............. 705/26.41; 705/18; 705/44; 705/76; 705/26.1; 726/2; 726/3; 726/4; 726/5; 726/26; 713/156; 713/162; 713/182; 713/185; 709/227; 709/228; 709/229

(58) Field of Classification Search
USPC ......................................................... 726/10
See application file for complete search history.

(56) References Cited

U.S. PATENT DOCUMENTS

| | | | |
|---|---|---|---|
| 7,188,179 B1 * | 3/2007 | Hanson et al. | 709/227 |
| 2005/0188220 A1 * | 8/2005 | Nilsson et al. | 713/201 |
| 2009/0245133 A1 | 10/2009 | Gupta | |

FOREIGN PATENT DOCUMENTS

| | | |
|---|---|---|
| WO | WO 2007/080490 A1 | 7/2007 |
| WO | WO 2007/112764 A1 | 10/2007 |
| WO | WO 2009/120466 A2 | 1/2009 |

OTHER PUBLICATIONS

U.S. Appl. No. 12/057,156, Mar. 27, 2008.
U.S. Appl. No. 12/613,784, Nov. 6, 2009.
U.S. Appl. No. 12/862,149, Aug. 24, 2010.
PCT Notification of Transmittal of the International Search Report and the Written Opinion of the International Searching Authority, or the Declaration, International Application No. PCT/US2011/046881, Oct. 19, 2011.
PCT Notification of Transmittal of the International Preliminary Report on Patentability and the Written Opinion of the International Searching Authority, International Application No. PCT/US2010/043005, May 18, 2012.

* cited by examiner

*Primary Examiner* — Nathan Flynn
*Assistant Examiner* — Bryan Wright
(74) *Attorney, Agent, or Firm* — Baker Botts L.L.P.

(57) ABSTRACT

In one embodiment, a method includes sending by an endpoint a request for information about available services to a network device; receiving by the endpoint a message from the network device, the message including information associated with a first service provider; determining by the endpoint whether the first address is certified by a trusted third party as being associated with the first service provider; if the first address is certified by the trusted third party, communicating by the endpoint with the first service provider using the information; and, in response to communicating with the first service provider using the information, receiving by the endpoint access to a service from the first service provider through the network device.

20 Claims, 2 Drawing Sheets

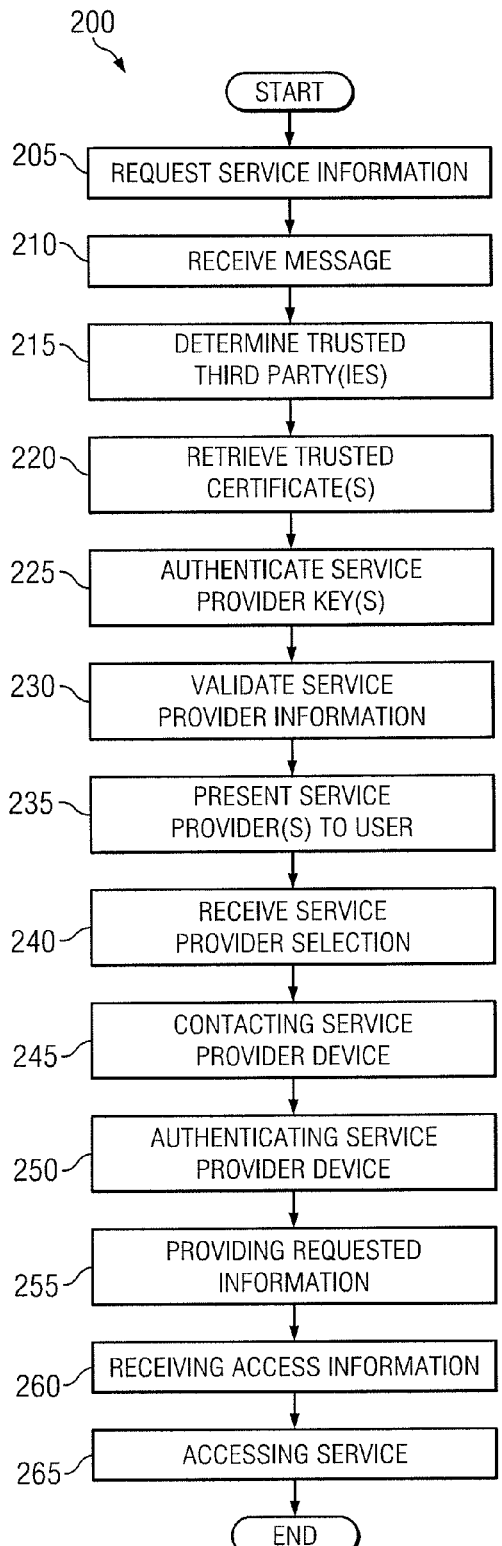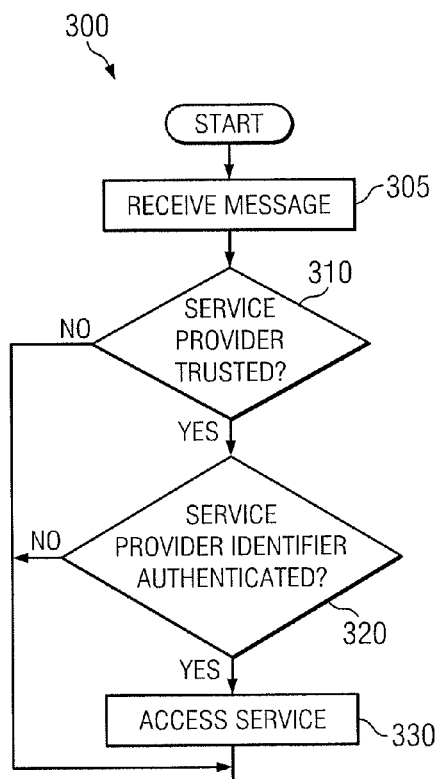
FIG. 2
FIG. 3

SYSTEM AND METHOD FOR SECURELY ACCESSING A WIRELESSLY ADVERTISED SERVICE

TECHNICAL FIELD

This disclosure relates generally to wireless communications.

BACKGROUND

The proliferation of mobile computing has led to the access of services (such as network services) from a variety of locations. In many situations, such locations are publicly accessible (such as a wireless hotspot). Accessing services by a user may involve the transfer of sensitive information such as authentication information (e.g., usernames and passwords) and/or payment information (e.g., bank account numbers and credit card information) through a publicly accessible network. Accessing services from public locations may be vulnerable to multiple attacks. For example, an attack may compromise sensitive information that is transferred while attempting to access the services. As another example, an attack may allow the node accessing the services to be compromised. An attacker may use a man-in-the-middle attack. Hence, security vulnerabilities exist when attempting to access services from a publicly available network.

BRIEF DESCRIPTION OF THE DRAWINGS

FIG. 2 illustrates an example method for securely accessing an advertised service.

FIG. 3 illustrates another example method for securely accessing an advertised service.

DESCRIPTION OF EXAMPLE EMBODIMENTS

Overview

In one embodiment, a method includes sending by an endpoint a request for information about available services to a network device; receiving by the endpoint a message from the network device, the message including information associated with a first service provider; determining by the endpoint whether the information is certified by a trusted third party as being associated with the first service provider; if the first address is certified by the trusted third party, communicating by the endpoint with the first service provider using the information; and, in response to communicating with the first service provider using the information, receiving by the endpoint access to a service from the first service provider through the network device.

DESCRIPTION

Figure 1:
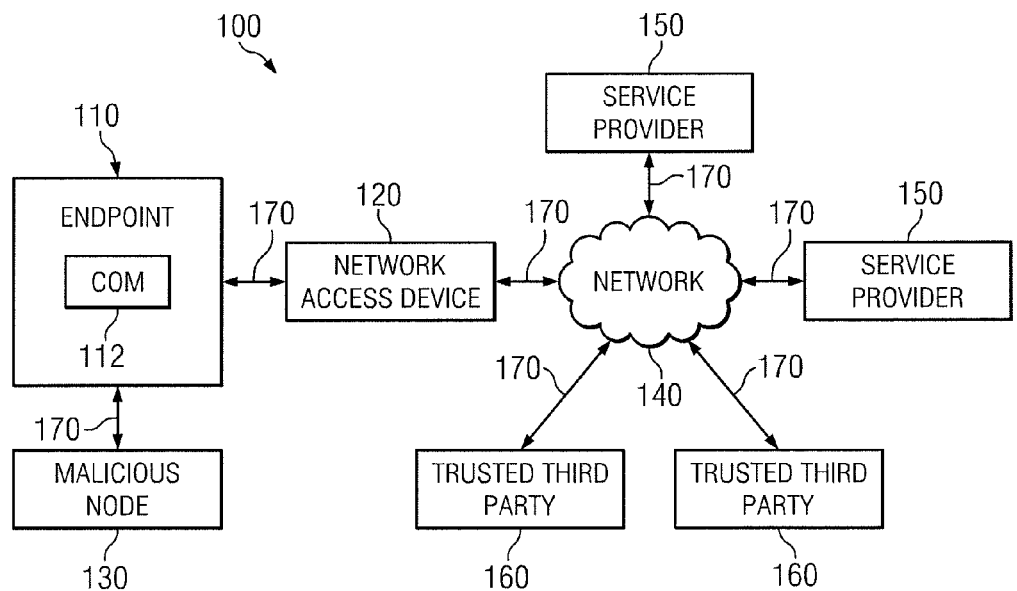
FIG. 1 illustrates an example system for securely accessing an advertised service.

FIG. 1 illustrates an example system 100 for securely accessing an advertised service. System 100 includes an endpoint 110, network-access device 120, malicious node 130, network 140, one or more service providers 150, and one or more trusted third parties 160. In particular embodiments, network-access device 120 provides endpoint 110 access to services provided by service providers 150 through network 140 and endpoint 110 uses information provided by trusted third parties 160 to determine whether to access those services. Such services may include facilitating access to or communication with one or more particular networks (which may but need not necessarily include network 140). For example, service providers 150 may provide endpoint 110 a connection to the Internet. Malicious node 130 may attempt to cause endpoint 110 to provide information to malicious node 130 by advertising a service to endpoint 110.

In particular embodiments, network 140 is an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or another network 140 or a combination of two or more such networks 140. Network 140 may include one or more networks 140. This disclosure contemplates any suitable network 140. Links 170 couple endpoint 110 to network-access device 120 and to malicious node 130 and couple network-access device 120, service providers 150, and trusted third parties to network 140. In particular embodiments, one or more links 170 each include one or more wireline, wireless, or optical links. In particular embodiments, one or more links 170 each include an ad hoc network, an intranet, an extranet, a VPN, a LAN, a WLAN, a WAN, a WWAN, a MAN, a portion of the Internet, a portion of the PSTN, a cellular telephone network, or another link 170 or a combination of two or more such links 170. A link 170 may include one or more links 170. This disclosure contemplates any suitable links 170. Links 170 need not necessarily be the same throughout system 100. One or more first links 170 may differ in one or more respects from one or more second links 170.

In particular embodiments, endpoint 110 enables a person at endpoint 110 to access services provided by service providers 150. As an example and not by way of limitation, endpoint 110 may access a wireless network provided by network-access device 120 and a service provider 150 may provide network-access device 120 access to the Internet. As a result, endpoint 110 may access the Internet service provided by service provider 150 through network-access device 120. Endpoint 110 may be a smartphone (or handheld), a personal digital assistant (PDA), a tablet computer system, a netbook, a laptop computer system, a desktop computer system, a kiosk computer system, a combination of two or more of these or any other suitable endpoint 110.

Endpoint 110 may include a communication module 112 (COM 112). As an example and not by way of limitation, COM 112 may include one or more hardware or software components or a combination of two or more such components for communicating with network-access device 120, service providers 150, or trusted third parties 160. COM 112 may be a device coupled to endpoint 110 that enables or facilitates communication, authentication, or verification when receiving and processing service advertisements. As an example and not by way of limitation, COM 112 may process a service advertisement received at endpoint 110 from network-access device 120. The service advertisement advertises a service from service provider 150. In particular embodiments, the service advertisement may originate from a device separate from network-access device 120 and accessible through network-access device 120. COM 112 may use a certificate provided by trusted third party 160 to authenticate the identity of the service provider 150 in the received service advertisement. If service provider 150 is authenticated, COM 112 may use information in the service advertisement to contact service provider 150 and access the advertised service.

In particular embodiments, network-access device 120 facilitates access to network 140. As an example and not by way of limitation, network-access device 120 may be coupled to network 140 either directly or through another device (such as a modem). Network-access device 120 may provide a wireless network that is accessed by endpoint 110. Hence, in this example, network-access device 120 may send information to endpoint 110 from network 140 and may send information from endpoint 110 to network 140 using the wireless network. As an example and not by way of limitation, network-access device 120 may include one or more firewalls, routers, hotspots, gateways, proxies, access points (APs), hubs, servers, or adapters or a combination of two or more of these. This disclosure contemplates any suitable network-access device 120. In particular embodiments, network-access device 120 or network 140 may include firewalls or other hardware or software components that create security zones or secure networks, such as de-militarized zones (DMZs).

In particular embodiments, malicious node 130 may offer services to endpoint 110 as though network-access device 120 were offering those services to endpoint 110. As an example and not by way of limitation, malicious node 130 may advertise a service providing access to the Internet as if the service was being provided by service provider 150. Malicious node 130 may communicate to endpoint 110 false information that appears to be associated with one or more service providers 150. As an example and not by way of limitation, malicious node 130 may provide a false service declaration to endpoint 110 that appears to be from a service provider 150. The false service declaration may include an address (such as, for example, a Uniform Resource Locator (URL) or other address) for endpoint 110 to follow to access the falsely declared service. If endpoint 110 follows the address, malicious node 130 may attempt to collect sensitive information from endpoint 110, such as financial information. In particular embodiments, if endpoint 110 follows the address, malicious node 130 may attempt to install malware (such as, for example, viruses, trojans, or spyware) on endpoint 110. Malicious node 130 may be a smartphone, a PDA, a tablet computer system, a netbook, a laptop computer system, a desktop computer system, or a kiosk computer system or a combination or two or more of these. This disclosure contemplates any suitable malicious node.

In particular embodiments, a service provider 150 provides services through network 140. Example services that a service provider 150 may provide include network-access services, Internet-access services, enterprise-network services, media-access services, and virtual private network (VPN) services. A service provider 150 may include one or more firewalls, routers, hotspots, gateways, proxies, access points, hubs, servers, adapters, or other equipment for providing services through network 140. This disclosure contemplates any suitable service provider 150 providing any suitable service. As an example and not by way of limitation, service provider 150 may provide access to the Internet. Endpoint 110 may receive a service advertisement from network-access device 120 that contains information about the Internet-access service of service provider 150. Endpoint 110 may use that information to contact service provider 150 and receive Internet access. In particular embodiments, a service provider 150 is associated with one or more trusted third parties 160.

In particular embodiments, a trusted third party 160 validates the identity of service providers 150 for endpoints 110. As an example and not by way of limitation, endpoint 110 may receive a service advertisement that uses a digital signature to identify service provider 150. Trusted third party 160 may provide a certificate to endpoint 110 validating that the digital signature is associated with service provider 150. A trusted third party 160 may include one or more firewalls, routers, gateways, proxies, servers, databases, adapters, key distribution centers, or other equipment for validating the identity of service providers 150 for endpoints 110. This disclosure contemplates any suitable trusted third party 160. In particular embodiments, a trusted third party 160 may be a certificate authority, such as VERISIGN. A trusted third party 160 may use public and private key pairs to digitally sign or otherwise authenticate information provided by a service provider 150. A trusted third party 160 may use digital certificates known by endpoint 110 or provided to endpoint 110 by network-access device 120, service provider 150, or trusted third party 160 for authentication and validation purposes. In particular embodiments, a trusted third party 160 may be owned and operated by an enterprise that a user of endpoint 110 is employed by or otherwise associated.

In particular embodiments, system 100 provides endpoint 110 a secure manner of selecting and accessing services advertised by service providers 150 through network-access device 120. As an example and not by way of limitation, network-access device 120 may communicate one or more messages to endpoint 110 that contain one or more service advertisements or service declarations associated with one or more service providers 150. For example, and not by way of limitation, network-access device 120 may communicate an Institute of Electrical and Electronics Engineers (IEEE) 802.11u Mobility Services Advertisement Protocol (MSAP) advertisement that contains a service declaration associated with a service provider 150. In particular embodiments, the advertisement may originate from a device separate from network-access device 120 and accessible through network-access device 120. The messages may contain network addresses associated with service providers 150 that endpoint 110 may use to access the advertised or declared services. The messages or parts of the messages may also be signed by one or more keys associated with one or more service providers 150. Endpoint 110 may attempt to validate the service advertisements or service declarations to help ensure that they were sent by network-access device 120 on behalf of service providers 150. Endpoint 110 may use one or more certificates, signatures, or keys from one or more trusted third parties 160 to verify that the keys used in signing the messages correspond to service providers 150. In particular embodiments, the one or more certificates, signatures, or keys may be stored at endpoint 110 prior to receiving the messages. If endpoint 110 validates the keys as corresponding to service providers 150, endpoint 110 may then use the keys to attempt to determine whether service providers 150 have authenticated information regarding the advertised or declared services. Endpoint 110 may then present to a user at endpoint 110 the option of selecting one of service providers 150. Endpoint 110 may use a logo, icon, or text found in the service declaration or service advertisement when presenting this option to the user. In particular embodiments, the logo or icon may be expressed in a graphics format such as Graphics Interchange Format (GIF), Portable Network Graphics (PNG), or other suitable formats. After receiving the selection from the user, endpoint 110 may access the service offered by service provider 150 selected by the user using the associated address found in the messages, such as in the service declaration or service advertisements. In particular embodiments, when accessing the service, endpoint 110 may receive authentication information from the service and verify that the authentication information is consistent with the information signed by service provider 150 in the service advertisement.

In particular embodiments, endpoint 110 may authenticate network-access device 120 or a device that originates the advertisement. The advertisement may include information identifying entities that are allowed to advertise one or more services. For example, a media service provider may indicate that its service may only be advertised from a hotspot access device at a particular franchise (such as a restaurant or coffee-shop franchise). Such information may be in a portion of the message that is signed by service provider 150. In particular embodiments, endpoint 110 may subsequently receive a message advertising a service and use the information identifying entities that are allowed to advertise one or more services to validate that the message was received from an approved entity. For example, endpoint 110 may receive a message advertising a service and proceed to present the service offering to a user after verifying that the message was received from network-access device 120 because endpoint 110 has previously identified network-access device 120 as an approved entity for advertising the service.

In particular embodiments, malicious node 130 may attempt to offer services to endpoint 110. Malicious node 130 may not actually provide any services but may attempt to appear as a service provider, such as a service provider 150. Malicious node 130 may attempt to obtain sensitive information from endpoint 110, such as authentication information or financial information. For example, and not by way of limitation, malicious node 130 may request authentication information or financial information from endpoint 110 as a condition to allowing access to its advertised service even though malicious node 130 may or may not actually provide the advertised service.

FIG. 2 illustrates an example method 200 for securely accessing an advertised service. The method starts at step 205, where an endpoint requests from a network-access device information about available services offered by one or more service providers. In particular embodiments, steps of method 200 may be performed by: endpoint 110 and COM 112 (with respect to steps described as performed by an endpoint), network-access device 120 (with respect to steps described as performed by a network-access device), malicious node 130 (with respect to steps described as performed by a malicious node), service provider 150 with respect to steps described as performed by a service provider), and trusted third party 160 (with respect to steps described as performed by a trusted third party). In particular embodiments, an endpoint may be communicating with a network-access device in a public location, which may include a wireless hotspot. Other endpoints may also be in the public location communicating with network-access device. A malicious node may also be in the public location and able to communicate with network-access device as well as the endpoint. As an example and not by way of limitation, the network-access device may provide a wireless or wired network to which both the endpoint and the malicious node may be coupled. In particular embodiments, the network-access device may provide a public IEEE 802.11 wireless network, which may provide a Wi-Fi hotspot.

At step 210, in particular embodiments, the endpoint may receive a message from the network-access device. For example, the endpoint may receive an IEEE 802.11u advertisement, such as an MSAP advertisement. The message may include one or more service declarations from one or more service providers (such as service providers 150 of FIG. 1). The one or more service declarations may include information about services offered by the service providers, such as an address where the service may be accessed, identity information regarding the service provider(s), identifier(s) associated with the service provider(s), description regarding the service(s) offered by the service provider(s), or configuration information regarding the offered service(s).

In some situations, the endpoint may receive multiple messages, each containing information regarding one or more service providers. The received message(s) may include information used to verify the identity or authenticity of the service provider(s), such as one or more certificates, digital signatures, or security keys.

At step 215, in particular embodiments, the endpoint may determine one or more trusted third parties (such as trusted third parties 160a and 160b of FIG. 1) from the received message(s) at step 210. Service providers may be verified or authenticated by the trusted third parties. A trusted third party may be used to authenticate identity information associated with a service provider such as a name, icon, or public key. A trusted third party may provide a certificate that includes the information used to authenticate identity information associated with a service provider, such as an X.509 logotype certificate described in The Internet Engineering Task Force Request For Comment 3709 (IETF RFC 3709). One or more certificates, digital signatures, or security keys included in the message(s) may be used to determine the trusted third parties included in the message. In particular embodiments, the endpoint may identify the trusted third parties in order to authenticate or verify the identity of the service provider. This may be advantageous in some situations. For example, if the endpoint was coupled to a public network (such as a Wi-Fi hotspot), a malicious node may send one or more messages to the endpoint falsely advertising services using a valid service provider's name or logo in order to compromise the endpoint or to receive sensitive information from the endpoint (such as financial information and access credentials). A malicious node may perform a man-in-the-middle attack. As discussed further below, the endpoint may determine the one or more third parties in order to verify or authenticate the identity of the service providers identified in the message(s) received at step 210.

At step 220, in particular embodiments, the endpoint may retrieve one or more certificates, digital signatures, or security keys associated with the trusted third parties identified at step 215. The endpoint may retrieve them from a local source (such as a local cache) or from a remote source (such as a server). For example, the endpoint may retrieve a certificate, public key, or digital signature from a certificate repository such as VERISIGN. In particular embodiments, a certificate repository may be provided by an enterprise or advertisement service.

At step 225, in particular embodiments, one or more service provider keys may be authenticated by the endpoint using the information retrieved at step 220. For example, the message received at step 210 may include information from a service provider that is signed or secured using a certificate, digital signature, or key of the service provider. The service provider key(s) may be in a certificate received at step 210. A trusted third party may provide authentication or verification that the certificate (or digital signature or key) used to sign or secure the service provider information belongs to the service provider. For example, if an Internet Service Provider (ISP) advertised a service through the network-access device, the ISP may digitally sign the information using a key included in the advertisement. The retrieved information from the trusted third party at step 220 may be used to verify or authenticate that the key used to sign the information of the ISP belongs to the ISP. Other forms of verification may be performed at this step, such as verifying that the certificate(s) used by the service provider(s) have not expired and are signed and formatted correctly. Certificates may be validated using techniques such as Certificate Revocation List (CRL), Online Certificate Status Protocol (OCSP), or Server-Based Certificate Validation Protocol (SCVP). The endpoint may use one or more of these methods to validate a one or more certificates (such as a logotype certificate), digital signatures, or keys. For example, an enterprise or certificate authority may have one or more authentication servers that may be used to authenticate or validate service provider certificates. This may be advantageous. For example, a malicious node may send a message to the endpoint pretending to be an ISP. The message may include digitally signed information and a key used to sign the information. By using information from a trusted third party to verify or authenticate the key as coming from a legitimate ISP, the endpoint may be able to avoid sending sensitive information to the malicious node when attempting to access the service advertised by the malicious node. For example, the endpoint may determine that the key used by the malicious node does not belong to the ISP advertised in the message from the malicious node and, therefore, not attempt to access the service offered by the malicious node. In situations where the endpoint receives advertisements from multiple service providers at step 210, step 225 may be performed for each service provider identified in the message received at step 225 with a service provider key.

At step 230, in particular embodiments, service provider information in the message(s) received at step 210 may be validated by the endpoint using the service provider key(s) authenticated at step 225. Service provider information may include one or more addresses, logos, icons, identifiers, configuration instructions, constraints, or parameters. For example, a service provider key may be used to authenticate or verify that an address in the message is associated with the service provider associated with the service provider key. In particular embodiments, the service provider information may be digitally signed or may be a part of a digitally signed portion (such as a service declaration) of the message received at step 210. The service provider information may also be part of information that is verified or authenticated by the trusted third party. For example, the endpoint may verify that any information authenticated by the service provider is consistent with information authenticated by the trusted third party. In particular embodiments, the service provider may determine which entities may advertise the service. As a result, the endpoint may authenticate the originator of the advertisement to verify that it is authorized to advertise the service. In another example, the endpoint may receive advertisements from multiple service providers. The addresses corresponding to each of the service providers whose key has been authenticated at step 225 may be validated at step 230. In particular embodiments, if a service provider's key failed to be authenticated at step 225, then its advertised service may be ignored by the endpoint and step 230 may not be performed with respect to that service provider. The address(es) validated at step 230 may be provided by a service provider in order to enable access to an advertised service. For example, the address may be an Internet Protocol (IP) address, a Uniform Resource Locator (URL), or a Uniform Resource Identifier (URI).

At step 235, in particular embodiments, the endpoint may provide a list of service providers identified in message(s) received at step 210 to a user of the endpoint. Service provider(s) presented to the user may be those that have had their keys and information validated at steps 225 and 230. They may be presented to the user in a variety of manners, including using text, graphics (such as logos and animations), audio, and video. In particular embodiments, Audio messages may be used to present the service providers to the user. At step 240, the endpoint receives a selection of a service provider from the user. For example, the user may have been presented with a list of logos or text indicating the available service providers and may have selected one of them using a keyboard, mouse, tablet, or touch screen. In particular embodiments, the endpoint may be configured to automatically select a service provider without user input at step 240 (step 235 may not be performed). The endpoint may use policies or rules to automatically select a service provider without user input at step 240.

At step 245, in particular embodiments, a device associated with the service provider determined at step 240 may be contacted by the endpoint in order to access service advertised by the service provider. For example, the endpoint may use communicate using an address associated with the selected service provider with a server of the selected service provider. As another example, the endpoint may enter a network authentication session with a device to be granted access to a network, such as wireless network. Examples of suitable network authentication sessions include IEEE 802.1x sessions, Wi-Fi Protected Access (WPA and/or WPA2) sessions, IEEE 802.11i sessions, or other suitable sessions. Information regarding such network authentication sessions may be included in the message received at step 210. At step 250, in particular embodiments, the service provider device may be authenticated by the endpoint. For example, the endpoint may verify that the device responding to the contact performed at step 245 is associated with the service provider determined at step 240 using the information validated in steps 225 and 230. Protocols such as HTTPS may be used to perform step 250. In particular embodiments, the service provider device may transmit authentication information to the endpoint that is used by the endpoint to authenticate the service provider device.

At step 255, in particular embodiments, the endpoint may provide requested information to the service provider device authenticated at step 250. The requested information may have been requested by the service provider device. For example, if the endpoint visited an Internet site associated with an address in the service declaration of the service provider, the site may request information such as: user name, password, financial information (e.g., payment method, selection of service packages), and type of service. At step 260, in particular embodiments, the endpoint may receive access information from the service provider. This information may include credentials, configuration instructions or parameters that may be used to access the service offered by the service provider (at step 265). The access information may be a response to the requested information provided by the endpoint at step 255. For example, if the service provided was access to the Internet, access information received at step 260 may include authentication information, port information, cookie information, encryption information, or proxy information. In particular embodiments, access information may not be received by the endpoint (hence, step 260 may not be performed). For example, the service provider may determine that the endpoint should have access to the Internet based on the requested information and may use an identifier of the endpoint (such as a MAC address) in order to allow the endpoint access to the Internet without needing to send access information to the endpoint.

Although this disclosure describes and illustrates particular steps of the method of FIG. 2 as occurring in a particular order, this disclosure contemplates any suitable steps of the method of FIG. 2 occurring in any suitable order. In particular embodiments, steps 235-240 may be performed before steps 215-230. For example, the endpoint may present the user with the service providers identified in the message received at step 205 before performing steps 215-230. After the endpoint has received the selection of a service provider from the user (step 240), the endpoint may perform steps 215-230 in order to validate the selected service provider. If the selected provider has been validated as described by steps 215-230, then steps 245-265 may be performed in order for the endpoint to access the service provided by the selected service provider. Moreover, although this disclosure describes and illustrates particular components carrying out particular steps of the method of FIG. 2, this disclosure contemplates any suitable combination of any suitable components carrying out any suitable steps of the method of FIG. 2.

FIG. 3 illustrates another example method 300 for securely accessing an advertised service. The method starts at step 305, where an endpoint receives a message from a network-access device containing information about available services offered by one or more service providers. In particular embodiments, steps of method 300 may be performed by: endpoint 110 and COM 112 (with respect to steps described as performed by an endpoint), network-access device 120 (with respect to steps described as performed by a network-access device), service provider 150 (with respect to steps described as performed by a service provider), and trusted third party 160 (with respect to steps described as performed by a trusted third party). In particular embodiments, an endpoint may be communicating with a network-access device in a public location, which may include a wireless hotspot. Other endpoints may also be in the public location communicating with network-access device. A malicious node may also be in the public location and able to communicate with network-access device as well as the endpoint. As an example and not by way of limitation, the network-access device may provide a wireless or wired network to which both the endpoint and the malicious node may be coupled. In particular embodiments, the network-access device may provide a public Institute of Electrical and Electronics Engineers (IEEE) 802.11 wireless network, which may provide a Wi-Fi hotspot.

At step 305, for example, the endpoint may receive an IEEE 802.11u advertisement, such as an MSAP advertisement. The message may include one or more service declarations from one or more service providers (such as service providers 150 of FIG. 1). The one or more service declarations may include information about services offered by the service providers, such as an address where the service may be accessed, identity information regarding the service provider(s), identifier(s) associated with the service provider(s), description regarding the service(s) offered by the service provider(s), or configuration information regarding the offered service(s).

In some situations, the endpoint may receive multiple messages, each containing information regarding one or more service providers. The received message(s) may include information used to verify the identity or authenticity of the service provider(s), such as one or more certificates, digital signatures, or security keys.

At step 310, in particular embodiments, the endpoint may determine whether the service provider(s) identified in the message received at step 305 is trusted. For example, the endpoint may determine whether a service provider signature or key in the message has been previously validated. In particular embodiments, the description of steps 215-225 of FIG. 2 above provides an example of how the endpoint may have previously validated a service provider signature or key. As another example, the endpoint may have received one or more pre-approved service provider signatures or keys from a trusted source (such as an entity of an enterprise network to which the endpoint is associated). The endpoint may compare the service provider signatures or keys found in the message received at step 305 to the pre-approved service provider signatures or keys and determine whether they match.

If the endpoint determines that the service provider identified in the message is not trusted, the endpoint may not access the service associated with that service provider. If the endpoint determines that the service provider identified in the message is trusted, step 320 may be performed. In particular embodiments, the endpoint may have received service offerings for multiple service providers. For example, the endpoint may have received multiple messages at step 305 each advertising at least one service from a service provider or the message received at step 305 may have contained multiple service advertisements from multiple service providers. In such situations, the endpoint may determine whether each of the service providers is trusted and proceed to step 320 for those service providers that have been determined to be trusted.

At step 320, in particular embodiments, the endpoint may determine whether service provider identifiers in the message received at step 305 have been authenticated as belonging to the service provider determined to be trusted at step 310. For example, and not by way of limitation, the endpoint may determine whether the identifiers found in the message have been signed by a digital signature or key of the trusted service provider. In particular embodiments, the description of step 230 of FIG. 2 above provides an example of how the endpoint may authenticate the service provider identifier. If the service provider identifier has been authenticated, then the service may be accessed (at step 330). If the service provider identifier was not authenticated, then the endpoint may not access the service advertised in the message received at step 305. At step 330, for example, the endpoint may access the service by contacting the service provider using the information in the message received at step 305. In particular embodiments, the description of steps 235-265 of FIG. 2 above provides an example of how the endpoint may perform step 330.

Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components carrying out particular steps of the method of FIG. 3, this disclosure contemplates any suitable combination of any suitable components carrying out any suitable steps of the method of FIG. 3. In particular embodiments, performing the steps of FIG. 3 may provide one or more advantages. For example, the steps of FIG. 3 may provide an efficient and secure manner for accessing a service advertised over a public network.

Figure 4:
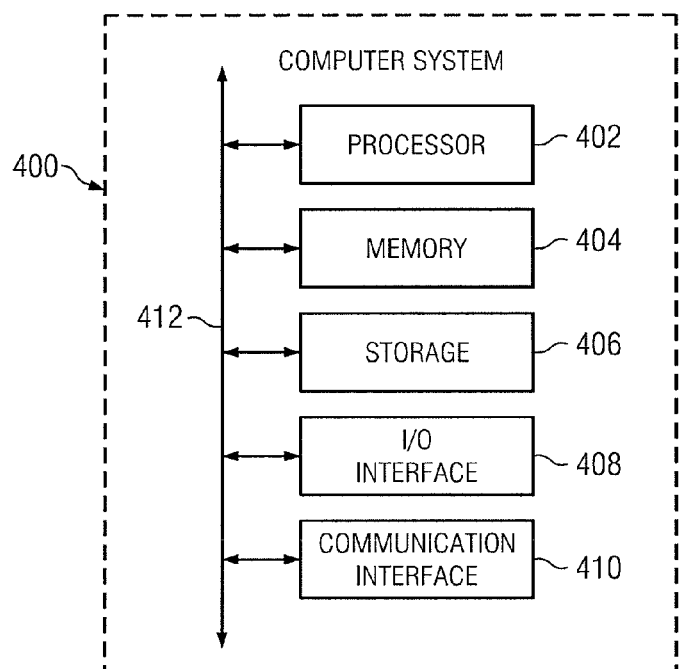
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (e.g., another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (e.g., packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 402 (e.g., one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   sending by a client computing device a request for information about available services to a network device;
   receiving by the client computing device a message from the network device, the message comprising information associated with a first service provider;

determining by the client computing device whether the information is certified by a trusted third party as being associated with the first service provider by:
retrieving by the client computing device a trusted certificate associated with the trusted third party using a first address, the message comprising the first address, the trusted certificate comprising a trusted third party key;
authenticating by the client computing device a service provider key with the trusted third party key, the message comprising the service provider key; and
in response to authenticating the service provider key with the trusted third party key, validating that a first service-provider identifier associated with the first address was created by the service provider key;
if the information is certified by the trusted third party, communicating by the client computing device with the first service provider; and
in response to communicating with the first service provider, receiving by the client computing device access to a service from the first service provider through the network device.

2. The method of claim 1, wherein the message comprises a first service declaration, the first service declaration comprising a first service-provider identifier, a second address, a first service description, and a first service-provider signature.

3. The method of claim 1, wherein:
the trusted third party is a first trusted third party;
the message comprises a first service-provider identifier associated with the first service provider, information associated with a second service provider, and a second service-provider identifier;
the client computing device determines whether the information associated with the first service provider is certified by the trusted third party at least in part by:
determining whether the first service-provider identifier is associated with a first trusted identifier certified by the first trusted third party; and
attempting to validate the first trusted identifier; and
the method further comprises:
determining by the client computing device whether the information associated with the second service provider is certified with a second trusted third party by:
determining whether the second service-provider identifier is certified by a second trusted identifier certified by the second trusted third party; and
attempting to validate the second trusted identifier;
if the information associated with the first service provider is certified by the first trusted third party and the information associated with the second service provider is certified with the second trusted third party, presenting by the endpoint the first and second service-provider identifiers to a user; and
in response to presenting the first and second service-provider identifiers to the user, receiving by the endpoint a user selection of either the first service provider or the second service provider.

4. The method of claim 3, wherein:
the first trusted identifier and the second trusted identifier are the same; and
the first trusted third party and the second trusted third party are the same.

5. The method of claim 1, wherein:
the message comprises the first service-provider identifier, the first service-provider identifier comprising an icon;
the message comprises a trusted identifier of the trusted third party, the trusted identifier comprising a logotype certificate; and
the trusted third party comprises a certificate authority.

6. The method of claim 1, further comprising:
receiving by the client computing device a second message from the network device, the second message comprising a service declaration and a service advertiser identifier;
determining whether the service advertiser identifier is authenticated as belonging to a service advertiser; and
if the service advertiser identifier is authenticated as belonging to the service advertiser, accessing, by the client computing device, a second service provided by the service advertiser.

7. The method of claim 1, further comprising:
receiving by the client computing device a second message from the network device, the second message comprising a service declaration and a service provider certificate, the service declaration comprising a second address, the service provider certificate comprising a second key;
determining by the client computing device whether the service provider certificate is certified by a second trusted third party;
if the service provider certificate is certified by the second trusted third party, determining by the client computing device whether the service declaration is signed by the second key; and
if the service declaration is signed by the second key, accessing by the client computing device a second service using the second address.

8. The method of claim 1, wherein:
the message comprises a second address associated with the first service provider; and
communicating by the client computing device with the first service provider comprises communicating using the second address by:
contacting, by the client computing device, a server associated with the second address;
receiving, at the client computing device, authentication information from the server;
validating, by the client computing device, the authentication information; and
in response to validating that the authentication information is consistent with the second address, sending requested information from the client computing device to the server.

9. A computer-readable non-transitory storage medium embodying software that is operable when executed to:
send a request for information about available services to a network device;
receive a message from the network device, the message comprising information associated with a first service provider;
determine whether the information is certified by a trusted third party as being associated with the first service provider by:
retrieving a trusted certificate associated with the trusted third party using a first address, the message comprising the first address, the trusted certificate comprising a trusted third party key;
authenticating a service provider key with the trusted third party key, the message comprising the service provider key;
in response to authenticating the service provider key with the trusted third party key, validating that a first service-provider identifier associated with the first address was created by the service provider key;

if the information is certified by the trusted third party, communicate with the first service provider using the information; and in response to communicating with the first service provider using the information, receive access to a service from the first service provider through the network device.

10. The medium of claim 9, wherein the message comprises a first service declaration, the first service declaration comprising a first service-provider identifier, a second address, a first service description, and a first service-provider signature.

11. The medium of claim 9, wherein:
the trusted third party is a first trusted third party;
the message comprises a first service-provider identifier associated with the first service provider, information associated with a second service provider, and a second service-provider identifier;
determining whether the information associated with the first service provider is certified by the trusted third party comprises:
determining whether the first service-provider identifier is associated with a first trusted identifier certified by the first trusted third party; and
attempting to validate the first trusted identifier; and
the software is further operable when executed to:
determine whether the information associated with the second service provider is certified with a second trusted third party by:
determining whether the second service-provider identifier is certified by a second trusted identifier certified by the second trusted third party; and
attempting to validate the second trusted identifier;
if the information associated with the first service provider is certified by the first trusted third party and the information associated with the second service provider is certified with the second trusted third party, present the first and second service-provider identifiers to a user; and
after presenting the first and second service-provider identifiers to the user, receive a user selection of either the first service provider or the second service provider.

12. The medium of claim 11, wherein:
the first trusted identifier and the second trusted identifier are the same; and
the first trusted third party and the second trusted third party are the same.

13. The medium of claim 9, wherein:
the message comprises the first service-provider identifier, the first service-provider identifier comprising an icon;
the message comprises a trusted identifier of the trusted third party, the trusted identifier comprising a logotype certificate; and
the trusted third party comprises a certificate authority.

14. The medium of claim 9, wherein the software is further operable when executed to:
receive a second message from the network device, the second message comprising a service declaration and a service advertiser identifier;
determine whether the service advertiser identifier is authenticated as belonging to a service advertiser;
if the service advertiser identifier is authenticated as belonging to the service advertiser, access a second service provided by the service advertiser.

15. The medium of claim 9, wherein the software is further operable when executed to:
receive a second message from the network device, the second message comprising a service declaration and a service provider certificate, the service declaration comprising a second address, the service provider certificate comprising a second key;
determine whether the service provider certificate is certified by a second trusted third party;
if the service provider certificate is certified by the second trusted third party, determine whether the service declaration is signed by the second key; and
if the service declaration is signed by the second key, access a second service using the second address.

16. The medium of claim 9, wherein:
the message comprises a second address associated with the first service provider; and
communicating with the first service provider comprises communicating using the second address by:
contacting a server associated with the second address;
receiving authentication information from the server;
validating the authentication information; and
in response to validating that the authentication information is consistent with the second address, sending requested information to the server.

17. An apparatus comprising:
a communication interface;
a memory storing software for execution by one or more processors; and
one or more processors coupled to the memory, the processors being operable when executing the software to:
send a request via the communication interface for information about available services to a network device;
receive a message via the communication interface from the network device using the communication interface, the message comprising information associated with a first service provider;
determine whether the information is certified by a trusted third party as being associated with the first service provider by:
retrieving a trusted certificate associated with the trusted third party using a first address, the message comprising the first address, the trusted certificate comprising a trusted third party key;
authenticating a service provider key with the trusted third party key, the message comprising the service provider key;
in response to authenticating the service provider key with the trusted third party key, validating that a first service-provider identifier associated with the first address was created by the service provider key;
if the information is certified by the trusted third party, communicate via the communication interface with the first service provider using the information; and
in response to communicating with the first service provider using the information, receive via the communication interface access to a service from the first service provider through the network device.

18. An apparatus comprising:
a communication interface;
a memory storing software for execution by one or more processors; and
one or more processors coupled to the memory, the processors being operable when executing the software to:
send a request via the communication interface for information about available services to a network device;

receive a message via the communication interface from the network device using the communication interface, the message comprising information associated with a first service provider;

determine whether the information is certified by a trusted third party as being associated with the first service provider;

if the information is certified by the trusted third party, communicate via the communication interface with the first service provider using the information by:

provinding requested information to the first service provider, the requested information comprising payment information;

receiving credentials for access to the service; and receiving configuration information for access to the service; and in response to communicating with the first service provider using the information, receive via the communication interface access to a service from the first service provider through the network device.

19. A method comprising:

sending by a client computing device a request for information about available services to a network device;

receiving by the client computing device a message from the network device, the message comprising information associated with a first service provider;

determining by the client computing device whether the information is certified by a trusted third party as being associated with the first service provider;

if the information is certified by the trusted third party, communicating by the client computing device with the first service provider by:

providing requested information from the client computing device to the first service provider, the requested information comprising payment information;

receiving from the first service provider credentials for access to a service associated with the first service provider; and receiving from the first service provider configuration information for access to the service; and in response to communicating with the first service provider, receiving by the client computing device access to the service from the first service provider through the network device.

20. A computer-readable non-transitory storage medium embodying software that is operable when executed to:

send a request for information about available services to a network device;

receive a message from the network device, the message comprising information associated with a first service provider;

determine whether the information is certified by a trusted third party as being associated with the first service provider;

if the information is certified by the trusted third party, communicate with the first service provider using the information by:

providing requested information to the first service provider, the requested information comprising payment information;

receiving from the first service provider credentials for access to a service; and receiving from the first service provider configuration information for access to the service; and in response to communicating with the first service provider using the information, receive access to the service from the first service provider through the network device.

* * * * *